June 20, 1933.   E. P. BURRELL   1,914,400
HYDRAULICALLY OPERATED MACHINE TOOL
Filed Sept. 3, 1931   7 Sheets-Sheet 1
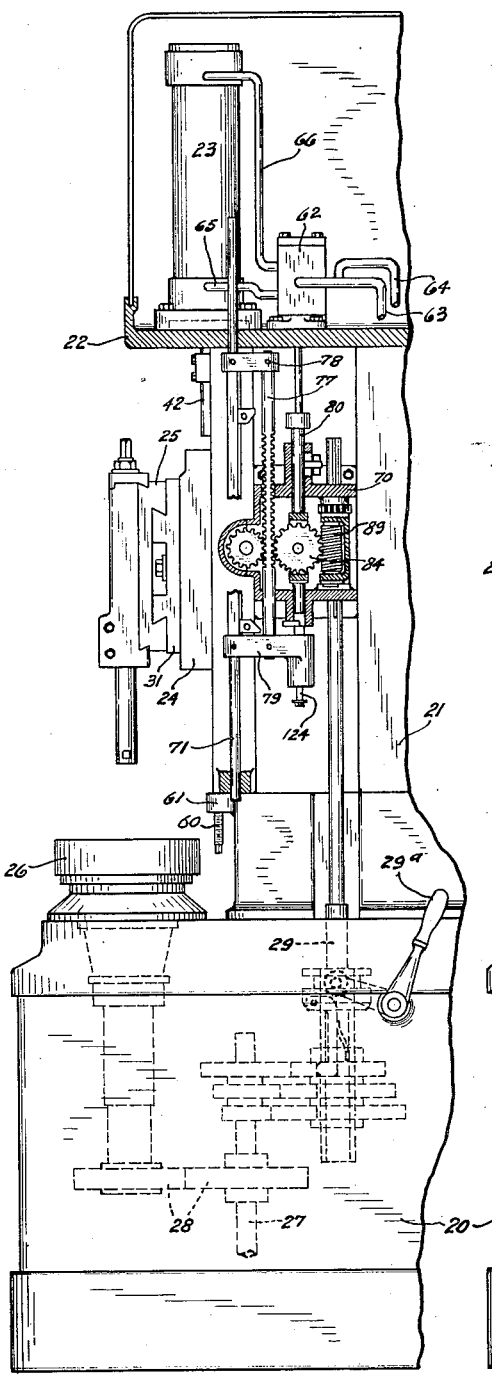
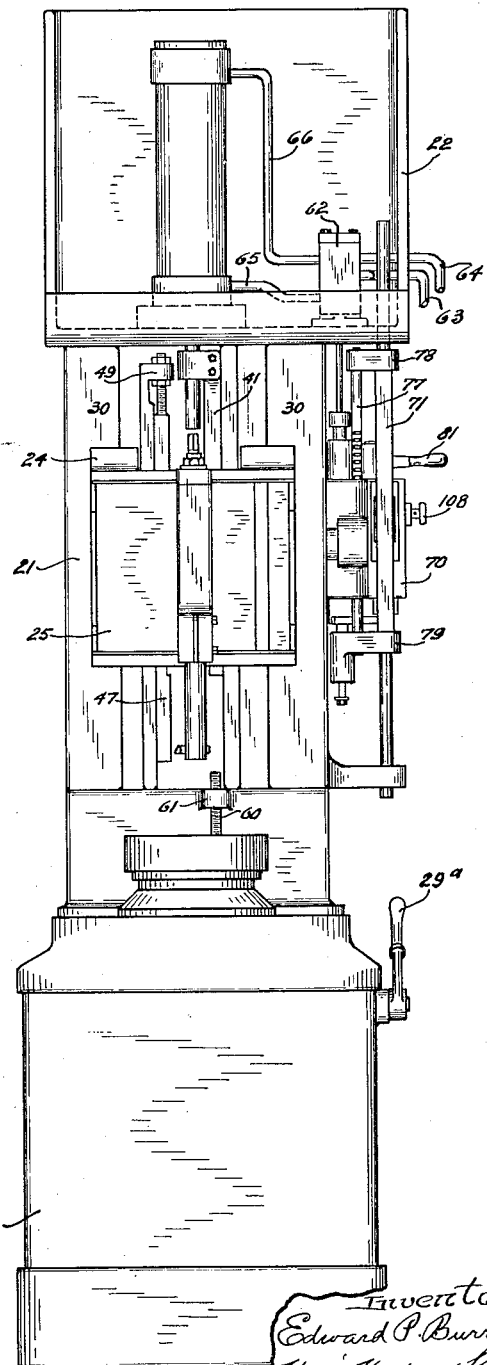

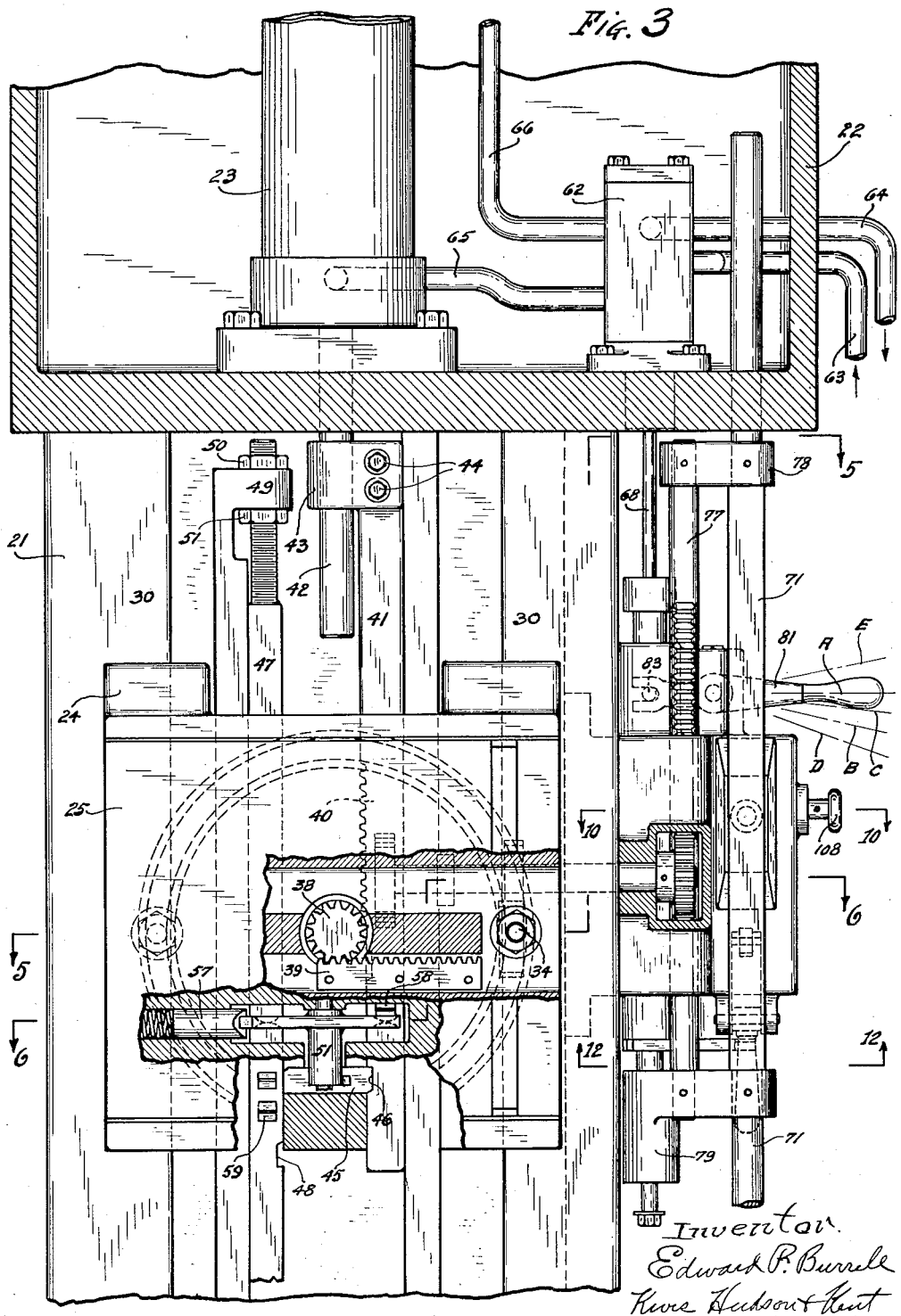

June 20, 1933.  E. P. BURRELL  1,914,400
HYDRAULICALLY OPERATED MACHINE TOOL
Filed Sept. 3, 1931   7 Sheets-Sheet 3

Inventor
Edward P. Burrell
Kwis Hudson & Kent
attys.

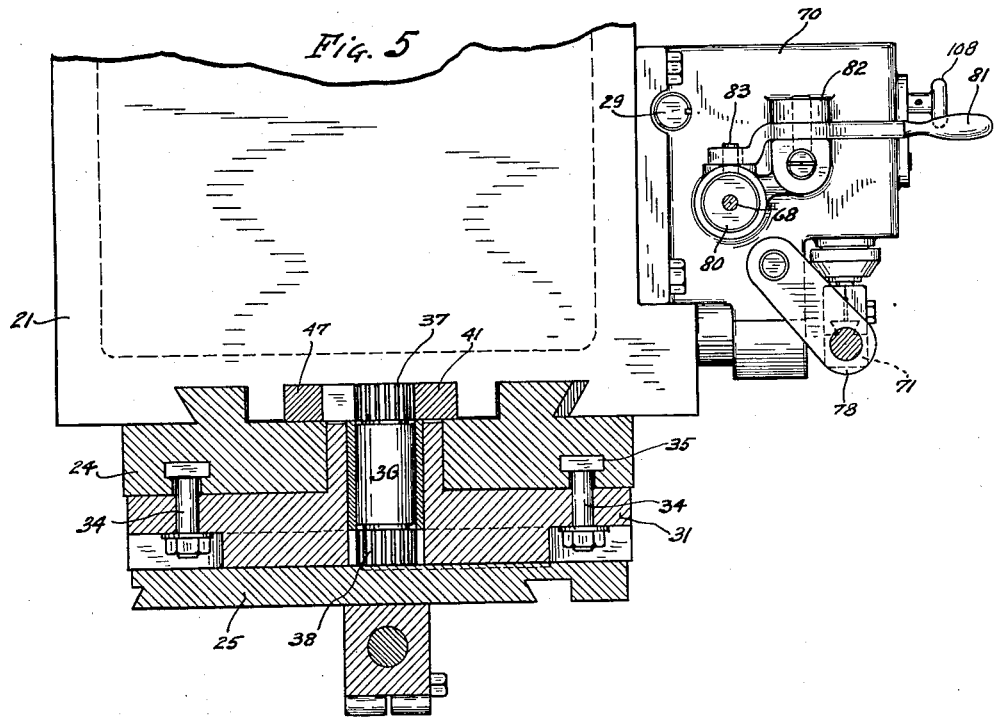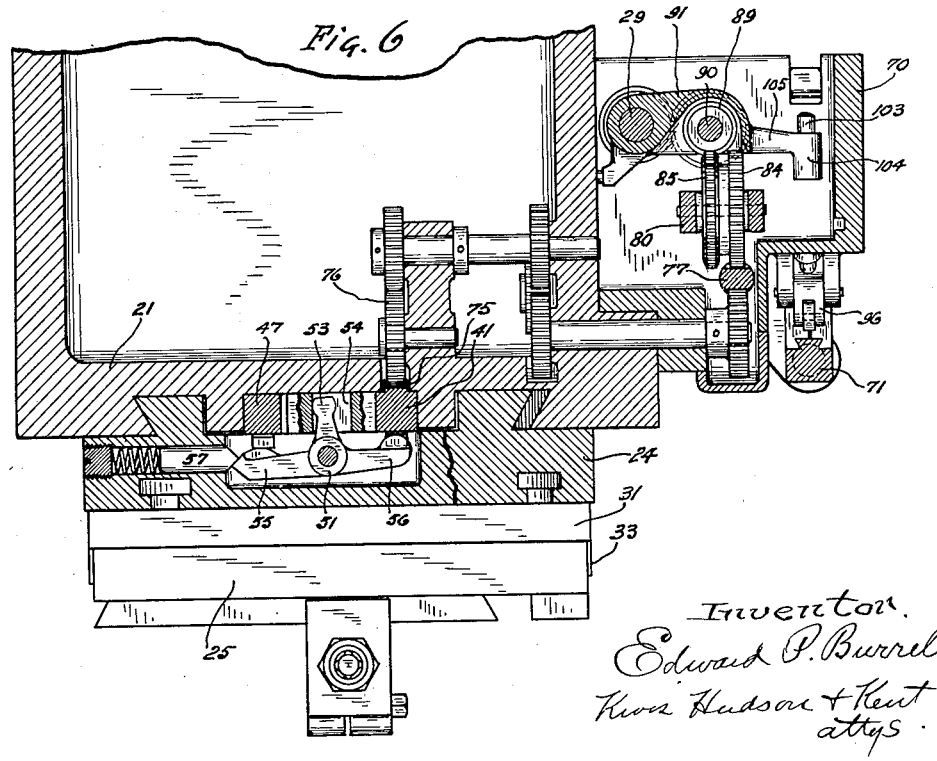

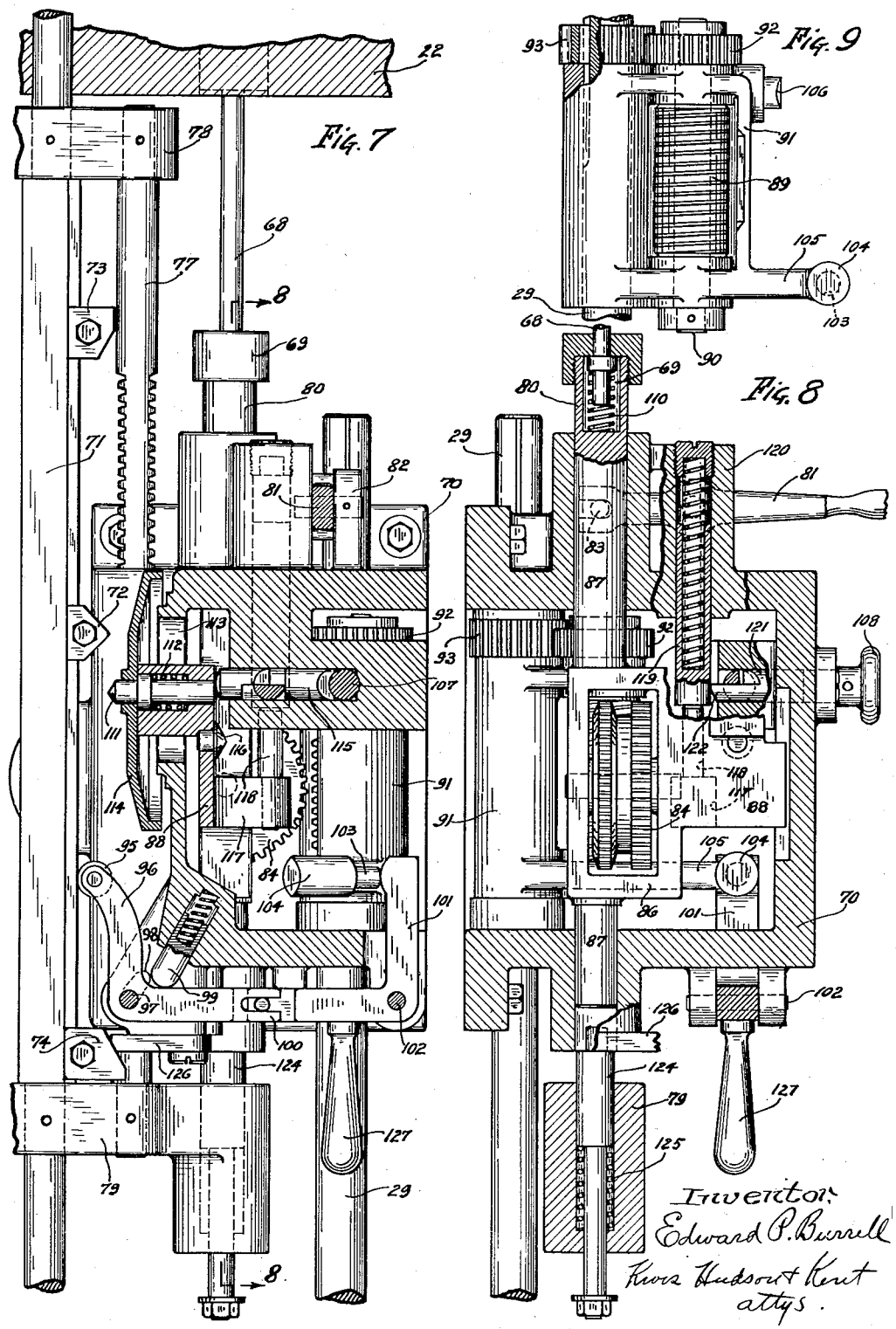

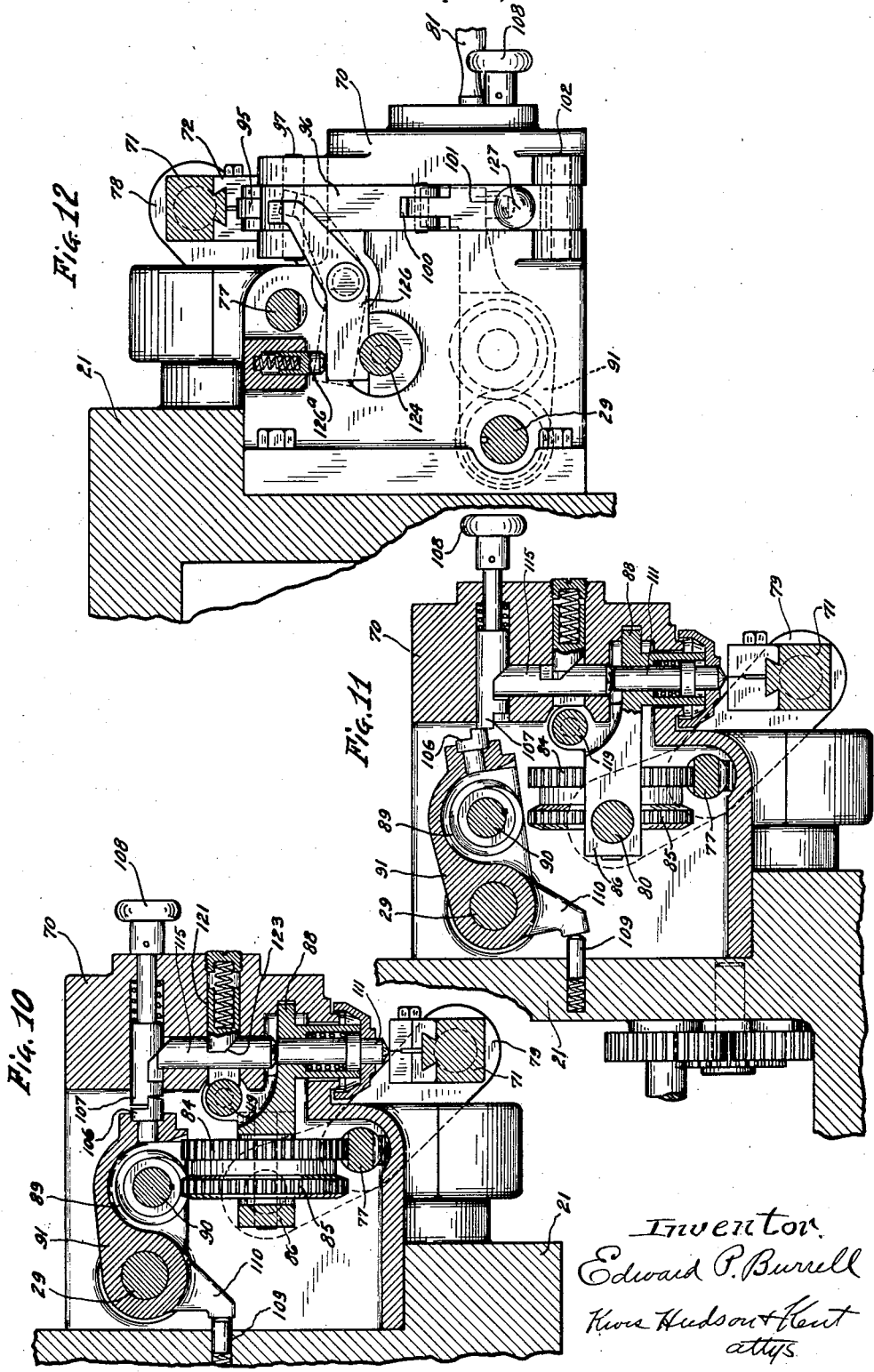

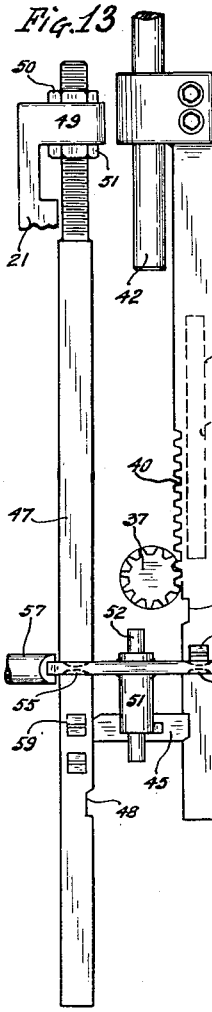
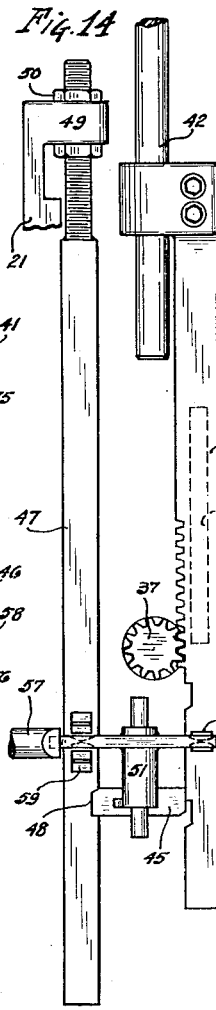
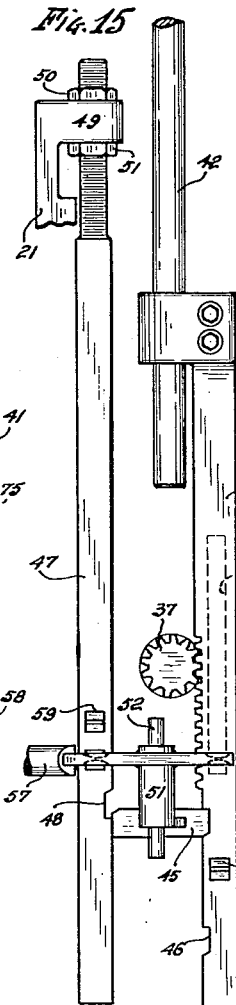
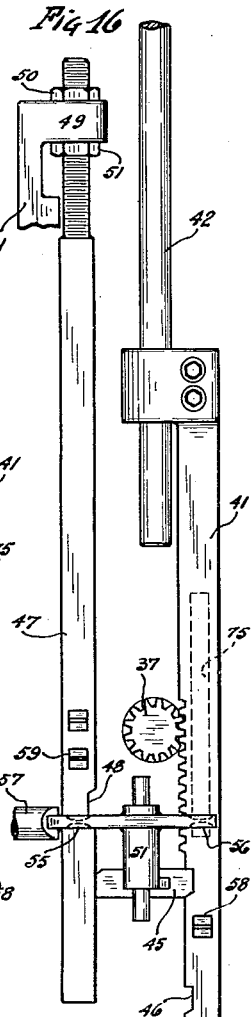
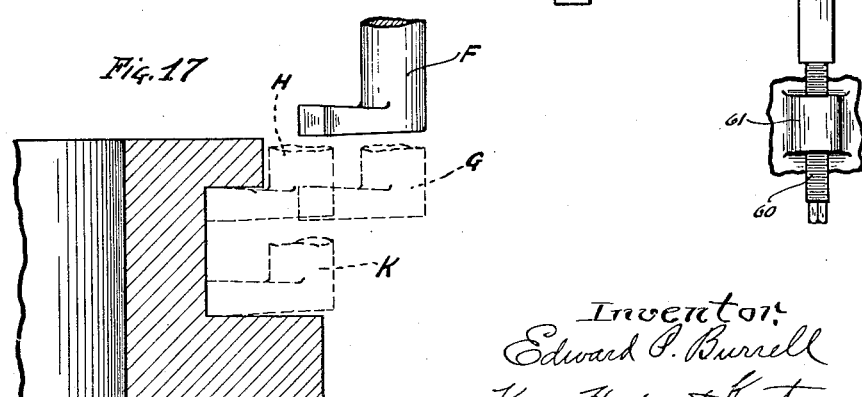

Patented June 20, 1933

1,914,400

UNITED STATES PATENT OFFICE

EDWARD P. BURRELL, OF SHAKER HEIGHTS, OHIO, ASSIGNOR TO THE WARNER & SWASEY COMPANY, OF CLEVELAND, OHIO, A CORPORATION OF OHIO

HYDRAULICALLY OPERATED MACHINE TOOL

Application filed September 3, 1931. Serial No. 560,972.

This invention relates to an automatic machine tool provided with a hydraulic control system, and more particularly to such a machine provided with compound movable tool slides.

The invention finds particular utility in connection with machine tools such as lathes, either vertical or horizontal and for single or multiple spindle types wherein the movable members are tool or work holding slides movable in a plurality of directions. In machines of this general type the tool is usually given a rapid downward movement followed by a rapid angular movement for the purpose of bringing it into its work engaging position, then a relatively slow feeding movement followed by a downward feeding movement and if desired, additional crosswise and downward movements, depending upon the nature of the work and eventually a rapid return movement to return it to its original position.

An object of the invention is to provide an improved hydraulic actuating system for the movable members of a machine tool together with control means for insuring a constant movement thereof during the feed or relatively slow movement, when the cutting operation takes place, regardless of the variable leakage factor in the hydraulic system or other factors which might tend to cause an irregular movement.

Another object of the invention is to provide, in association with the control means referred to above, means for providing full automatic operation, including the automatic changes in speed or rate of movement and the reversal of movements, with a predetermined but variable dwell period between the end of the feeding movement and the rapid return movement.

A further object of the invention is to provide, in association with the hydraulic control means referred to above, a tool carriage including a plurality of slides which may be given a succession of movements in a plurality of different directions, the movements of which are automatically controlled.

Another object of the invention is to provide hydraulic control means for operating a tool holding mechanism to automatically change its direction of motion in accordance with the particular requirements of the work which the tool is operating upon.

The above and other objects are attained by the present invention which may be here briefly summarized as consisting in certain novel combinations and arrangements of parts and details of construction which will be described in the specification.

The hydraulic control system, together with the compound movable tool slide, may be used in either single or multiple spindle types of machines. However, the present embodiment of the invention is illustration as applied to a single spindle vertical type lathe.

In the accompanying drawings,

Figure 1 is a front elevation of a vertical lathe, with the top cover removed;

Fig. 2 is a side elevation of the same, with a portion in section;

Fig. 3 is an enlarged view of the central portion of Fig. 1 with certain portions in sections;

Fig. 5 is a view partly in section, taken on the irregular line 5—5 of Fig. 3;

Fig. 6 is a view partly in section, taken on the irregular line 6—6 of Fig. 3;

Fig. 7 is a view of the control mechanism as shown in Fig. 4 with portions in section;

Fig. 8 is a view partly in section, taken on the line 8—8 of Fig. 7;

Fig. 9 is a detached view of the worm and worm housing forming a part of the differential mechanism used in the control of the hydraulically actuated slides;

Fig. 10 is a view partly in section, taken on the line 10—10 of Fig. 3;

Fig. 11 is a view similar to Fig. 10 but showing the parts in a different position;

Fig. 12 is a view partly in section, taken on the line 12—12 of Fig. 3;

Figure 4:
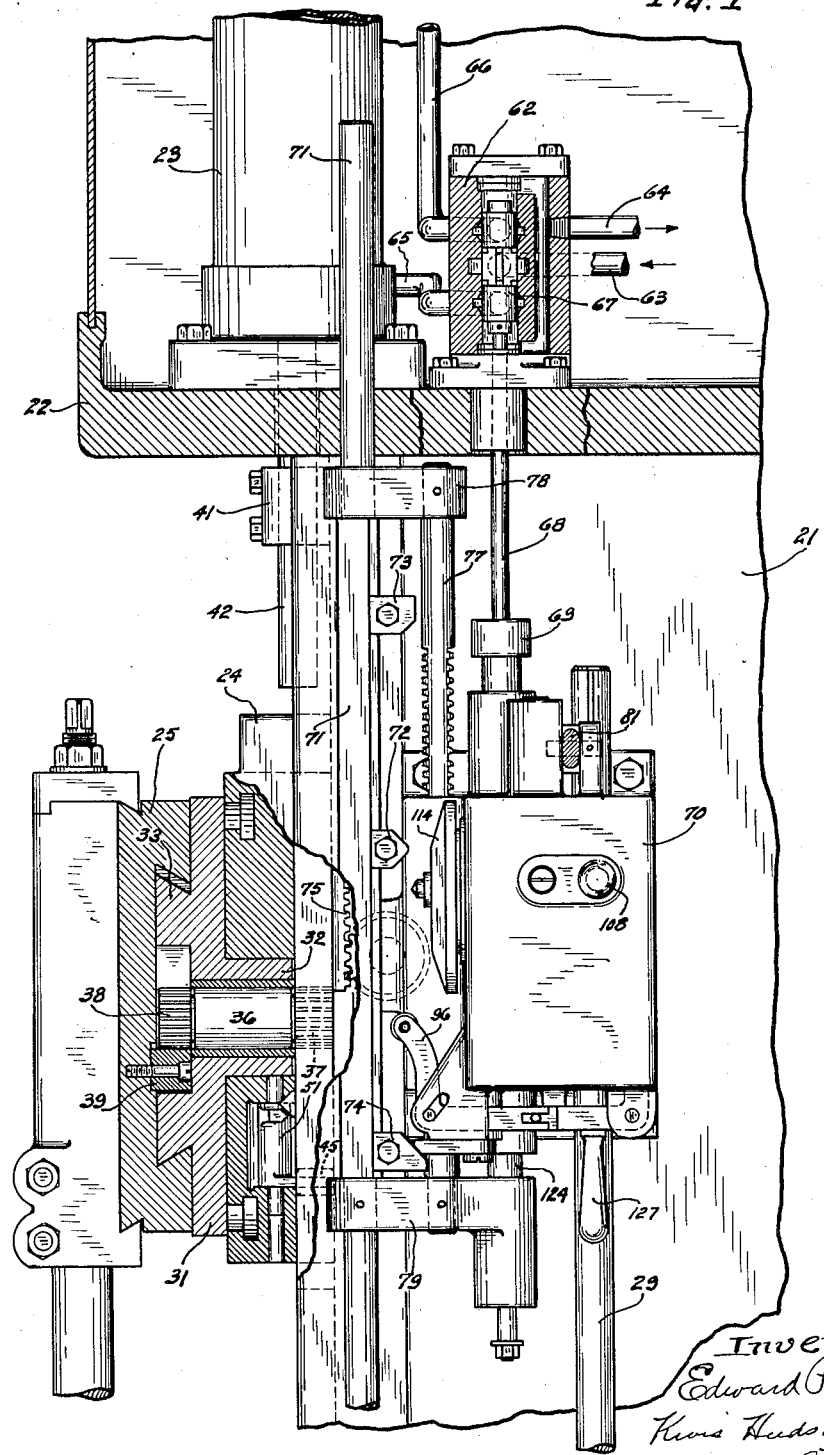
Fig. 4 is a side elevation of the portion of the machine shown in Fig. 3 with certain portions in section.

Figs. 13 to 16 inclusive are detached views showing different positions of the compound tool slide operating mechanism; and Fig. 17 is a sectional view taken through the work piece showing the different positions which the tool assumes in the performance of the operations illustrated.

The machine tool illustrated consists of a frame including a base 20 provided with an upright column 21. A head 22 is provided at the top of the column and supports the hydraulic motor or cylinder 23 which operates the tool support consisting of a main slide 24 and a compound or cross-slide 25. The work is carried by a work support 26 in the form of a spindle rotatably mounted in the base of the machine which may be driven in any suitable manner from a shaft 27 connected to a suitable source of power and gears 28, as is well known in the art. The driving means for the shaft 27 may be a variable speed motor or any other well known means connected thereto through change gears if desired, so that the work spindle may be driven at a plurality of different speeds. The main tool slide 24 is slidably mounted on guides 30 located on the front face of the column 21 and movable toward and from the work spindle. The cross-slide 25 is supported on the main slide and may move in unison with it or it may have an independent movement relative thereto. The cross-slide is directly supported upon a swivel plate 31 adjustably mounted for variable angular positions on the main slide. The swivel plate 31 is provided on its rear face with an integral cylindrical boss 32 rotatable in a corresponding opening in the main tool slide 24. The swivel plate 31 has on its outer face guideways 33 which support the cross-slide 25, and carries bolts 34 whose heads are T-shaped and engage in an annular groove 35 in the front face of the main slide, see Figs. 3, 4 and 5. The bolts 34 are for the purpose of rigidly fastening the swivel plate to the main slide in any desired angular position. The tool holder may be attached to the outer face of the cross slide by any means as is well known in the art.

A shaft 36 is rotatably supported in the boss 32 and carries pinions 37 and 38 at either end thereof. The cross-slide carries attached thereto a rack bar 39 in constant mesh with the pinion 38 located on the front end of shaft 36. Pinion 37 is constantly in mesh with rack teeth 40 on one side of a bar 41. The bar 41 is suitably guided on the column and is the actuating member for the tool slides and is operated by the hydraulic motor 23. The bar 41 is adjustably connected to the piston rod 42 of the hydraulic motor 23 by means of a clamp 43 forming part of the bar and the bolts 44. The piston rod 42 is operated by the hydraulic motor 23 and is moved in a path which is parallel with the path in which the bar 41 moves. It will be evident that if the main slide is locked to the bar 41 the two will move in unison, and therefore there can be no rotation of the shaft 36, and consequently no movement of the cross-slide relative to the main slide. If, however, the main slide is disconnected from the bar 41 and is locked to some stationary part on the frame, the shaft 36 will rotate as the bar 40 is moved up or down. This rotation of the shaft 36 together with pinions 37 and 38 will cause the cross-slide to move relative to the main slide.

The main slide carries near its lower end a transversely movable lock bolt 45. This bolt is so located that one end of it is opposite a face of the bar 41 provided with one or more notches 46 into which said bolt may project, as shown in Fig. 3, to lock the main slide 24 to the bar 41. The other end of the bolt is adjacent the inner face of an adjustable bar 47 also provided with notches 48 into which said bolt may project when in alignment therewith when it is withdrawn from its engagement with the bar 41. The bar 47 is suitably guided on the column 21 and adjustably connected in a boss 49 integral with the upper end of said column. Adjustment of the rod 47 is accomplished by movement of nuts 50 and 51 threaded on the upper end of said bar. The bolt 45 either connects the main slide with the stationary rod 47, as when it projects into a notch 48 in the stationary bar, or to the main bar 41, as when it projects into a notch 46 on said bar. When the bolt projects into a notch in either of these bars, its other end is in a position to engage an unnotched part of the face of the other bar which prevents the bolt from being withdrawn from the notch into which it is projecting.

For the purpose of shifting the lock bolt 45 out of a notch in one bar and into a notch in the other bar an automatic bolt shifter 51 is provided with three arms pivotally mounted on a vertical pin 52 carried by the main slide. One of the arms 53 of the bolt shifter 51 projects into an elongated slot 54 in the bolt. The other two arms 55 and 56 project in opposite directions from the pivot of the shifter and lie close to the front faces of the adjustable bar 47 and of bar 41. One arm of this bolt shifter is in a position to be engaged by the beveled end of a spring actuated plunger 57 which is mounted in an opening in the main slide, (see Figs. 3 and 6). As illustrated in Figs. 3, 6 and 13 to 16 inclusive, the bolt plunger 57 engages the inner side of the bevel of the arm 55 of the bolt shifter 51, urging the bolt 45 toward the left, when, through the action of a cam the bolt shifter is rocked past the knife edge or high part of the spring plunger, said plunger will engage the front side of the bevel of the arm 55 of the bolt shifter 51, thus urging the bolt 45 toward the right. On the front face of the bar 41 are one or more forwardly projecting V-shaped cams 58. The number and position of these cams will depend upon the nature of the work piece to be machined. The cams 58 are so constructed that they cam the arm 56 of the bolt shifter forwardly thus rocking said shifter. Similar V-shaped cams 59 are provided on the front face of the bar 47 in operative relation with the arm 55 of the bolt shifter 51. These parts act automatically to impose upon the bolt a tendency to move out of the slot in the bar in which it may be positioned into a slot in the other bar when the latter slot comes into registration therewith.

The operation and timing of the lock bolt mechanism is as follows, reference being had to Figs. 13 to 17 inclusive. Fig. 13 shows the position of the parts when the bar 41 and the slides are about to begin their downward movement. The lock bolt 45 is engaging one of the notches 46 in the bar 41 and is being urged toward the left by the action of the spring plunger 57 on the arm 55 of the bolt shifter. As the bar moves down under the action of the hydraulic motor 23 and its piston rod 42, it carries the main slide down with it. As the downward movement of the main slide continues, the arm 55 of the bolt shifter rides over the upper cam 58 on the bar 47, the bolt shifter having been thus positioned by the cam during the end of the last cycle of operation. As the bolt 54 comes into alignment with the slot 48, it moves into said slot and locks the main slide to the bar 47 which stops the downward movement thereof. The downward movement of the bar 41 continues and carries the cam 58 into engagement with the arm 56, see Fig. 14, which cam rocks said arm far enough to carry the beveled end of the arm 55 over the high point of the spring plunger. Thereupon the spring plunger acts through the bolt shifter to yieldingly press the bolt to the right and against the face of the bar 41. At this stage of the operation the parts are in the relative positions shown in Fig. 14. As the bar 41 continues to descend, the upper notch 46 aligns with the end of the bolt and the bolt snaps into said notch, disengaging the bolt from the notch 48 and releasing the main slide from the bar 47.

While the bolt 45 locked the main slide to the bar 47, the cross-slide was being moved relative to the main slide by the rack teeth 40 and pinions 37 and 38 and the rack 39 attached to the cross-slide. As soon as the bolt snaps into the upper slot 46 on bar 41, the main slide becomes locked to the bar 41 and again moves downward therewith. This downward movement of the bar 41, together with the main slide continues and as the bolt shifter moves down with the slide, the arm 55 engages the lower cam 59 on the bar 47 and the beveled end of the lever is moved over the high point of the spring plunger and again rides on the front face thereof. Fig. 15 shows the positions which the relative parts now assume.

The downward movement of the bar 41, together with the main slide, continues until the parts reach the final position shown in Fig. 16 when the lower end of the bar 41 abuts with the adjustable stop 60, which consists of an adjustable screw threaded into a boss 61 on the lower end of the column 21.

The various positions assumed by the tool are illustrated in Fig. 17. The full line drawing indicates the starting position F of the tool when the mechanism is in the position illustrated in Fig. 13. During the initial downward movement of the bar 41 the tool moves to position G shown in dotted lines. When the tool is in this position the control mechanism is substantially as illustrated in Fig. 14. The downward movement of the main slide has been arrested and the crosswise movement of the slide 25 has been initiated. The cross-slide movement continues under the operation of the mechanism as described above until the tool reaches the position H shown in dotted lines. At this point, the crosswise movement of the cross-slide is arrested, the main slide is again locked to the bar 41 and the downward movement of the tool continues until the bar 41 reaches the adjustable stop 60, at which time the tool reaches the position K shown in dotted lines.

The invention is not limited to the particular number and arrangement of cams 58 and 59 and notches 48 and 46, and the movements of the tool shown in Fig. 17, but any desired combination of movements may be obtained by varying the number and location of the cams and notches from the number and location illustrated, as will be apparent to those skilled in the art. The movements of the main slide and the cross-slide are dependent upon the location of these cams and notches, as will be evident from the explanation above, and any desired movements of these slides may be obtained by the proper location of the cams and slots. On the return movement of the tool to its starting position F, the operations above outlined are merely reversed, and the tool returns from position K to position H under the action of the main slide and from position H to position G under the action of the cross-slide and from position G to position F under the action of the main slide. It is understood that the tool may be brought into its work engaging position by a rapid movement, after which it may have a slow feeding movement until it reaches the position K, where it is held during a period of dwell and then returned to its starting position in quick motion.

As before stated, the tool slides of the machine are moved on the column by means of the cylinder 23 and piston rod 42. The operating fluid is supplied through a valve by a pump which may be of any of the standard forms employed in hydraulic operating systems of this general character. The pump will have the usual relief valve which will act at any predetermined pressure. The pump and the relief valve are not herein illustrated but the connections will be referred to.

In this instance, the cylinder 23 and the piston and piston rod 42 are mounted in the head 22 positioned vertically above the tool slides. The cylinder is attached by a flange in any suitable manner to the base of the head and the piston and piston rod are adjustably attached to the bar 41. The actuating fluid is supplied to the cylinder on opposite sides of the piston through the medium of a valve 62 secured to the base of the head adjacent to the hydraulic motor. Fluid is supplied by the pump to the valve 62 under suitable pressure by a pipe 63 and is exhausted from the valve by a pipe 64. The valve has delivery connections to the cylinder 23 on opposite sides of the piston. These connections may be established in different ways, but in the present instance the connections are made by pipes 65 and 66 connected to opposite ends of the cylinder bore.

The valve consists of a main body having a cylindrical bore and a movable valve piston 67. The valve piston 67 has two cylindrical end portions connected by a reduced skeleton portion, the cylindrical portions being adapted to cover and uncover ports in the cylindrical bore of the valve chamber, which ports communicate with the delivery and exhaust pipes 65 and 66, see particularly Fig. 4. The valve piston has connected thereto a valve rod 68 extending below the head and along the sides of the column. The valve rod is connected by means of a lost motion connection 69 to the end of a control slide of a control unit which includes a housing 70 bolted or otherwise secured to the column 21 below the valve 62, see Figs. 1, 4, 5 and 6.

The machine is provided with a cam bar 71 having a dovetail formed on its rear face as shown in Figs. 4, 5, 6 and 7. On said dovetailed face of the bar are mounted three cams 72, 73 and 74. The cam bar 71 has an extended portion on each end thereof, the upper extension being guided in an opening in the base of the head while the lower extending portion is guided in an opening in a lug at the lower end of the column, see Fig. 1, and moves with the bar 41 as will be described presently. The bar 41 is provided with a second rack portion 75 on the rear side thereof, see Figs. 4 and 6. The bar 41 through its rack portion 75 and suitable gearing 76 moves a rack bar 77 in the same direction and at the same speed as the bar 41. The rack bar 77 is slidably supported in openings in the housing 70, see Fig. 2, and is attached to the cam bar 71 at the upper end by a bracket 78 and at its lower end by a bracket 79. From this construction it will be apparent that as the bar 41 is moved downwardly or upwardly the rack bar 77 and the cam bar 71 are moved in the same direction and at the same speed.

Referring again to the control unit of which the housing 70 is a part, as mentioned before the movable valve piston 67 is connected by the valve rod 68 and the lost motion coupling 69 to a control slide 80 slidably supported for vertical movement in the housing 70, see Figs. 2 and 8. The control unit also includes a control lever 81 for manual control which is pivotally mounted between a pair of ears 82 on the upper end of the housing 70 facing the valve 62. One end of the lever 81 projects outwardly beyond the housing 70 and the other end is forked and straddles a pin 83 carried by the control slide 80. The manual operation of the slide is only desired at times, as, for example, when trial cuts are being taken, it being understood that for the normal operation of the machine the valve is actuated automatically. The control mechanism includes a differential mechanism including several gear elements, one of which is the rack bar 77. This rack at all times engages a spur gear 84 which rotates with and may be integral with a worm wheel 85 constituting a gear unit of the differential mechanism. This unit, composed of the gears 84 and 85, is mounted on a pin carried by an enlarged portion 86 of the control slide, which portion is provided with an opening to accommodate the gears and side walls which carry the pin supporting the gears. The arrangement and manner of supporting the gears 84 and 85 is best illustrated in Figs. 6 and 8. The slide 80 has at its upper and lower ends two cylindrical extensions 87 which slidingly engage in bosses on the upper and lower wall of the housing 70, and an outwardly extending guide or tongue 88 which slidingly engages a guideway in the side wall of said housing.

By reference particularly to Figs. 9, 10 and 11, it will be seen that the worm wheel 85 engages a worm 89 supported on a short shaft 90 in a rocking worm bracket 91 pivotally supported on shaft 29. The shaft 90 which carries a worm 89 has pinned or otherwise secured to it a spur gear 92 meshing with a spur gear 93 which in turn is in keyed relation with the shaft 29, the arrangement being such that the bracket can be swung about the shaft 29 so as to allow the engagement of the worm 89 with the worm wheel when the bracket is in the position shown in Fig. 10, and to permit their disengagement when the bracket is swung from the position shown in Fig. 10 to the position shown in Fig. 11.

The shaft 29 extends along the side of the column and projects into the base as shown in Fig. 2 and at its lower end carries a change gear unit, the gears of which can be individually keyed to the shaft by a sliding key in a manner well known in the art. A handle 29a at the side of the machine may be used to shift the sliding key and connect any of the gears in the gear cone to the shaft, see Figs. 1 and 2. The shaft 29 is rotated in predetermined relation with the work spindle. It will be seen from the above that when the worm 89 is in mesh with the worm wheel 85, during the movement of either of the slides and the bar 41 together with the rack bar 77 which move in unison with said slides, said slides will have a constant movement at a rate dependent upon the rate of rotation of the worm 89, and any variation in the movement of the slides from that permitted by the rotation of the worm 89 will, by the differential action, cause a slight displacement of the control slide 80 and a movement of the valve piston such as to maintain the movement of the slides constant. The uniform movement of the slides is desired only when the slides are in feeding movement. Accordingly, means is provided to bring about the engagement and disengagement at the proper times of the worm 89 and worm wheel 85.

When the center line of the control lever 81 is in the position designated A in Fig. 3, i. e., neutral position, the main slide together with its cross slide is stationary. When the operator desires to start the operation of the machine, he moves the control lever to position B indicated by the center line of the lever which is the rapid downward position.

During the downward movement of the bar 41 the main slide moves down at a rapid rate until the tool has reached the position G, Fig. 16, at which time the main slide becomes locked to the column and the cross slide will move rapidly to the left until the tool reaches its cutting position where the slow or feeding movement of the tool commences, and the worm bracket 91 is automatically swung inwardly so as to engage the worm 89 with the worm wheel 85. This inward movement of the worm bracket 91 is accomplished by the following means. At the end of the rapid downward movement of the bar 41, one of the cams 72 on said cam bar 71 previously described comes into engagement with a roller 95 on a front bell crank 96 mounted in a pair of ears at the lower and outer side of the housing 70, see Fig. 7. This bell crank carries a pin 97 movable in diagonal slots 98 in the supporting ears which pin is normally held at the outer end of the slots, by the action of a spring plunger 99. When the cam 72 engages and depresses the roller 95 the bell crank 96 will be rocked about the pin 97 without displacing it from its position in the slots 98.

The lower arm of the bell crank 96 is forked, as shown at 100, and engages with an arm of a rear bell crank 101 pivotally mounted on a pin 102 between ears at the lower and outer side of the housing 70, see Figs. 7, 8 and 12. The rocking movement of the front bell crank 96 rocks the rear bell crank 101, moving an arm of the latter bell crank which projects into the housing. The inner end of this arm engages a yieldable plunger 103 which is carried in a boss 104 on an arm 105 projecting outwardly from the worm bracket 91. The effect of this rocking of the bell crank 101 is to swing the worm bracket 91 inwardly so as to engage the worm 89 with the worm wheel 85 or to rock it from the position shown in Fig. 11 to the position shown in Fig. 10. The spring plunger 103 between the bell crank arm 101 and the arm 105 of the worm bracket is provided so that should the teeth of the worm wheel not immediately slide into engagement, the spring plunger can yield and an instant later the compressed spring will slide the teeth of the worm and worm wheel into full engagement. As soon as the worm bracket is swung inwardly as just explained, a shouldered pin 106 carried by the worm bracket hooks over a shoulder of a spring bolt 107 projecting through the outer wall of the housing and provided at its outer end with a knob 108. The operator can at any time manually cause the disengagement of the worm 89 from the worm wheel 85 by pulling out on the knob 108.

The worm bracket 91 is continuously urged in a direction which tends to disengage the worm 89 from the worm wheel 85, by a spring plunger 109 mounted in the column 21 and which presses against an extension 110 on the bracket 91. Only a light spring is employed behind the spring plunger 109 so as not to interfere with the action of the spring plunger 103 carried by the arm 104.

As soon as the worm engages with the worm wheel the differential mechanism becomes effective, resulting in the slowing down the slide being moved, in this instance the cross slide, to the feeding rate determined by the rate of rotation of the worm 89. The worm 89 acting through the gears 85 and 84, together with the engagement of the gear 84 with the rack 77, moves the control slide 80 down so as to bring the center line of the control lever back from rapid forward position B to the feeding position C, see Fig. 3. Due to the continued differential action of these gears, the bar 41, and in this instance the cross slide, move at the predetermined constant rate throughout the feeding portion of the cycle. Any change in the rate of movement of the cross slide due to any of the causes previously mentioned, over that permitted by the rate of rotation of the worm 89 will cause an endwise movement of the control slide 80 and a slight shifting of the valve piston, sufficient to maintain the movement of the cross slide at a constant rate.

The feeding movement continues and when the movement of the cross slide is stopped will be continued by the main slide moving further downward until the tool reaches the position K, Fig. 12 and the bar 41 engages the stop screw 60. After the bar 41 together with the main slide comes to a stop, the return movements of said bar and slides are not immediately initiated for it is desired that there be a predetermined dwell between the end of the feeding movement and the beginning of the rapid return movement. Accordingly, the worm 89 is not immediately disengaged from the worm wheel 85, and, since the rack 77 is now stationary (during this dwell period) the effect of the differential mechanism is to move the control lever from the feeding position C (Fig. 3) downwardly. Position D indicates the center line of the lever in the approximate maximum dwell position which, as shown, is slightly beyond the rapid forward position B.

The movement of the lever in the downward direction as indicated is accompanied by a movement of the control slide 80 in the upward direction. In practice, the valve piston cannot be moved upwardly beyond the position corresponding to the rapid downward position B of the control lever, as the end of the valve piston will come up against the upper end of the valve chamber, and any further movement of the control slide 80 will compress a spring 110, see Fig. 8, in the lost motion connection between the valve rod 68 and the control slide. After the predetermined dwell period has elapsed, the worm 89 is disengaged from the worm wheel 85 and the control slide is immediately moved downwardly a sufficient distance to bring the center line of the control lever to the rapid return position indicated at E in Fig. 3, which operation is accomplished with the following mechanism.

When the bar 41, as stated above, comes to a stop at the end of the feeding movement of the slides one of the cams 73 on the cam bar 71 is close up to the forward end of a spring pin 111 (see particularly Fig. 7) mounted in a forward projecting portion 112 of the control slide 80. The portion 112 projects through a slot 113 in the front wall of the housing 70. A cover plate 114 is secured to said portion 112 of the control slide for the purpose of keeping dirt and other foreign matter out of the slot 113 and from the interior of the housing. The rear end of the spring pin 111 engages the front end of a cam bolt 115 which is mounted in a horizontal position in the side of the housing 70. The rear end of the cam bolt 115 is tapered and engages a tapered shoulder of the spring bolt 107. During the dwell period, the spring pin 111 which which is now moving upwardly with the control slide, comes in camming engagement with and is depressed by the cam member 73 and at the end of the dwell period, the length of which depends upon the position of the cam 73 on the cam bar 71, the spring pin 111 has been depressed sufficiently to move the cam bolt 115 rearwardly and in turn the spring bolt 107 outwardly sufficiently to disengage it from the shoulder pin 106 and allow the worm bracket 91 to move outwardly and disengage the worm from the worm wheel. It will be noted that the diameter of the cam bolt 115 is such that portions at least of the spring pin 111 and the cam bolt 115 will be in alignment over a fairly large range of movement of the control slide 80, so that the spring pin 111 can operate with various adjustments of the cam 73. But, should the cam 73 not be in the right position to effect the disengagement of the worm from the worm wheel by the action of the spring pin 111 on the cam bolt 115, a safety device in the form of a dog 116 is provided which is carried by the control slide at the outer face of the plate 88 and below the spring pin 111, see Fig. 7. The dog 116 is so arranged that if said spring pin 111 will not operate to move the cam bolt 115 inwardly because of improper location of said cam, the dog 116 will engage the cam bolt 115 and cam it rearwardly so as to cause the disengagement of the worm from the worm wheel. If the dog 116 brings about the disengagement of the worm from the worm wheel, the cycle of operations of the machine stops, thus indicating to the operator that the cam 73 is not in the proper position.

When the worm is disengaged by the movement of the spring pin 111 at the end of the dwell period, the rapid return movement of the slide is initiated as a result of the automatic movement of the control slide and valve such that the control lever is moved from position D to position E (see Fig. 3), the slide and the valve piston being moved downwardly by the following means: The control slide has a rearwardly projecting lug 117 (see Figs. 7 and 8) carried by the plate 88 carrying an upwardly projecting pin 118 which is in line with and is adapted to engage the end of a spring bolt 119 mounted in a boss 120 forming an extension of the upper wall of the housing 70. When the control lever was previously moved to the rapid downward position to initiate the cycle of movements, the control slide 80 was of course moved upwardly. During this movement of the control slide, the pin 118 moved the spring plunger 119 upwardly compressing its spring until a catch 121 snapped under the lower end of the spring bolt and retained it in its retracted position under the action of its associated spring (see Figs. 8 and 10). The catch 121 has an inward end 122 which holds the spring bolt 119 in its retracted position and a camming shoulder 123 which, when the catch is in position to engage the lower end of the spring plunger 119, lies in a cam notch of the cam bolt 115. Accordingly, when the worm is disengaged from the worm wheel by the movement of the spring pin 111 and the cam bolt 115, the latter, by its action on the cam shoulder 123, slides the catch 121 outwardly, disengaging its inner end 122 from underneath the spring bolt 119 whereupon the spring bolt is quickly moved downwardly by its associated spring and engages against the pin 118 carried by the control slide which moves the control slide and the valve downwardly, throwing the control lever to position E causing the rapid reverse return movement of the bar 41 and slides which will continue until said bar and slides have reached their starting position.

If the disengagement of the worm from the worm wheel is brought about by the action of the dog 116 on the cam bolt 115, the movement of the cam bolt takes place at a later time than if actuated by the movement of the spring pin 111, accordingly, the control slide will have moved further up, and the spring bolt 119 will have been moved up by the pin 118 a greater distance, i. e., beyond the end 122 of the catch 121. When the worm is released under the action of the dog 116, the catch 122 comes back in front of the spring bolt 119 so as to again restrain its downward movement which prevents it from moving the control slide 80 and the control lever to the position corresponding to the rapid return position E. The bar 41 and the slides remain in their downward position, indicating to the operator that cam 73 is not in its proper position.

When it is desired to have the machine repeat a number of cycles automatically, as would be the case when an automatic stock feeding or loading device is being employed, the bar 41 and the slides operated thereby can be automatically started again on their rapid downward movement by the following means.

The lower bracket 79, see Figs. 2, 4 and 8, connecting the cam bar 71 and the rack bar 77 has a downwardly projecting portion carrying a spring bolt 124 acted on by a spring 125 which is stronger than the spring associated with the spring bolt 119. This spring bolt 124 is in line with the downwardly extending portion 87 of the control slide 80 as clearly shown in Fig. 8. There is also provided on the bottom of the stationary housing facing the bracket 79 a pivoted catch 126, see Figs. 8 and 12, which in its normal position is held in abutting relation with shoulders on the downwardly projecting boss forming a bearing for the lower end of the projection 87 of the control slide 80 by means of a spring plunger 126a mounted in a lug on the housing 70 and said catch 126 is so arranged that one end thereof will engage in front of and move the spring plunger 124 inward during the latter part of the rapid return movement of the bar 41 and slides. During the last portion of said return movements of said bar 41 and slides, a cam 74 on the cam bar 71 engages the forward end of the pivoted catch 126, rocking its inner end from in front of the spring plunger 124, allowing the spring 125 to move the control slide upwardly as viewed in Fig. 8, thus moving the valve to its rapid downward position and moving the control lever from position E to position B. In so doing, the spring plunger 119 is moved upwardly against the action of its spring, and the inner end 122 of the catch 121 moves underneath the end of the plunger 119 and holds it in its retracted position so that it may function at the end of the dwell period to move the control slide in the opposite direction. The cam 74 is employed only when it is desired to set the machine so that the cycles of operation will be repeated automatically. If it is desired to have the machine come to a stop after each cycle of operation, the cam 74 is removed and the catch 126 is not withdrawn from in front of the spring bolt 124, with the result that when the slide comes to the end of its return movement all parts are stopped by the end of the piston on the piston rod 42 engaging the upper end of the cylinder bore of the cylinder 23, with the valve left standing in its position corresponding to rapid return. After a new work piece has been placed in the machine, the operator can initiate a new cycle by manually moving the control lever from rapid return position to rapid downward position. When the bar 41 and the slides come to a stop at the end of the return movement, if desired the operator may relieve the oil pressure in the cylinder by moving the control lever from rapid return position E to neutral position A.

It was previously stated that at any time during the feeding movement of the slides, the operator may pull out the knob 108 so as to cause the disengagement of the worm 89 from the worm wheel 85, and can then manipulate the control lever manually, as desired. He can also manually cause the engagement of the worm with the worm wheel at any time desired by rocking the bell crank 101 which is shown provided with a handle 127 for this purpose.

The operation of the machine with reference to the piece of work illustrated in Fig. 17 is as follows:

When a new work piece has been positioned in the spindle, the slide operating mechanism is in the position shown in Fig. 13, the tool is in position F illustrated in full lines in Fig. 17, and the control valve for controlling the movements of the slides is in neutral position with the control lever positioned as at A (see Fig. 3). When power is applied to the shaft 27 the work spindle and the shaft 29 are rotated in predetermined relation to each other. The operator moves the control lever 81 from position A to position B to start the cycle of operation of the machine. When the control lever is thus moved, the control slide 80, together with the valve connected thereto, is moved upward and admits fluid to the part of the cylinder above the piston which starts said piston and bar 41 in its rapid downward movement. Since the main slide 24 is locked to the bar 41, as shown in Fig. 13, the main slide moves downward with said bar until the tool reaches position G, at which time the main slide will be locked to the column, as shown in Fig. 14, and the cross-slide begins its rapid crosswise movement which is continued until the tool reaches its cutting position when the cam 72 will rock the bell cranks 96 and 101 and engage the worm and worm wheel. The engagement of the worm with the worm wheel puts the differential mechanism in operation and changes the rapid movement of the cross-slide into a feeding movement. The feeding movement of the cross-slide continues until the tool carried thereby reaches position H. When the tool reaches this position, the main slide is again locked to the bar 41, thus stopping the movement of the cross-slide and the tool will feed downwardly from position H to position K under the continued downward movement of the bar 41, until said bar reaches the adjustable stop 60 which limits its downward movement.

During the dwell period for the tool which now follows, the bar and main slide are held from further downward movement by the stop 60, thus preventing movement of the bar 41 and cam bar 71. The dog 73 carried by the cam bar is now positioned close above the pin 111. After the stopping of the bar 41, the differential mechanism, because of the continued rotation of the worm, will move the control slide 80 upwardly and the control lever downwardly to position D shown in Fig. 3. The lost motion connection 69 permits continued upward movement of the control slide after the valve piston has reached its uppermost position and the control lever will be moved during this upward movement of the control slide from position C to position D. The pin 111 will ride under the dog 73 and be cammed inwardly thereby, thus disengaging the worm from the worm wheel and withdrawing the catch pin 121 from below the spring plunger 119, releasing the spring plunger and permitting it to move the control slide downward under the action of the spring. This moves the control lever from position D to position E, changing the position of the valve such that it permits pressure fluid to enter the cylinder below the piston resulting in a rapid upward movement of the bar 41, during which movement of said bar the main slide and cross-slide, together with the tool, are returned to their starting position through a reversal of the downward movements explained above.

During the latter portion of the upward return movement of the bar 41 and the main slide, the spring plunger 124 will abut against the pivotal catch 126 compressing the spring 125. When the cam 74 engages one end of the pivoted catch 126, rocking said catch to move its other end from in front of said plunger, the spring plunger 124 is released and the control slide and the valve are moved upwardly under the action of the spring 125. During this upward movement of the control slide, the spring plunger 119 is also moved upwardly, compressing its spring, and said plunger is held in its upward position by the catch 121. This upward movement of the control slide and valve will again admit pressure fluid to the top of the cylinder above the piston and move the control lever from position E to position B thus starting a new cycle of operation, it being understood that an automatic stock feeding mechanism, during the return movement of the bar 41 and the slides, will remove the finished part from the work spindle and put a new work piece in position to be machined during the cycle of operations which now follows.

If it is desired that the machine come to a stop at the completion of each cycle of operations, the cam 74 is omitted or not positioned on the cam bar and the pivoted catch 126 is not withdrawn from in front of the spring plunger 124. The piston comes to a stop at the top end of the cylinder, thus stopping further upward movement of the bar 41 carried thereby and the slides, with the fluid pressure remaining below the piston. If the operator desires to release this pressure, he may do so by moving the control lever from position E to position A, thus moving the valve to neutral position.

While the invention has been shown as applied to a vertical type single spindle lathe, it will be evident that it is applicable to many other types of machine tools, either of the single or multiple spindle type or of the vertical or horizontal type, and I therefore do not desire to be confined to the precise details and arrangements shown and described but aim in my claims to cover all modifications which do not involve a departure from the spirit and scope of the invention as defined in the appended claims.

Having thus described my invention, I claim:

1. In a machine tool, two movable members, hydraulic means for moving one of said members relative to the other, a valve for controlling said hydraulic means, a differential mechanism operatively connected to said valve and said movable members to actuate said valve, a plurality of relatively slidable members, and means operatively connecting said hydraulically operated member to said slidable members.

2. In a machine tool, two movable members, hydraulic means for moving one of said members relative to the other, a valve for controlling said hydraulic means, a differential mechanism operatively connected to said valve for actuating the same and including gear members connected to said movable members, a plurality of relatively movable members, and means operatively connecting said hydraulically moved member to said plurality of relatively movable members.

3. In a machine tool, two movable members, hydraulic means for moving one of said members relative to the other, a valve for controlling said hydraulic means, a differential mechanism operatively connected to said valve and said movable members to actuate said valve, a plurality of slides, one of which has an independent movement relative to the other, and means for operatively connecting and disconnecting said hydraulically moved member with one of said slides.

4. In a machine tool, two movable members, hydraulic means for moving one of said members relative to the other, a valve for controlling said hydraulic means, a differential mechanism operatively connected to said valve and said movable members to actuate said valve, a plurality of relatively movable members, one of which is carried by another and capable of independent movement thereon, and means for operatively connecting and disconnecting said hydraulically moved member to one of said relative movable members.

5. In a machine tool, two movable members, hydraulic means for moving one of said members relative to the other, a valve for controlling said hydraulic means, a differential mechanism operatively connected to said valve and said movable members for actuating said valve, means for operatively connecting said hydraulically moved member to a plurality of relatively movable members for giving the members a succession of movements first together and then one relative to the other.

6. In a machine tool, two movable members, hydraulic means for moving one of said members relative to the other, a valve for controlling said hydraulic means, a differential mechanism operatively connected to said valve and said movable members to actuate said valve, said hydraulically moved member being operatively connected to a main slide and a cross-slide carried thereby, means operatively connected to the hydraulically moved member and said slides for giving first a combined movement to both slides followed by a movement of the cross-slide relative to the main slide.

7. In a machine tool, a rotary member, a member movable relative thereto, hydraulic means for moving said last named member, a member slidable relatively to the rotary member, means for connecting and disconnecting said slidable member to said hydraulically moved member, a valve for controlling the hydraulic means, and a differential mechanism operatively connected to said valve, said rotary member and said hydraulically moved member to actuate the valve.

8. In a machine tool, a rotary member, a movable member, hydraulic means for moving said movable member relative to said rotary member, a valve for controlling said hydraulic means, differential mechanism operatively connected to said valve, said rotary member and said movable member for controlling said valve, two relatively movable members, and means for operating one or the other of said relatively movable members by said hydraulically moved member.

9. In a machine tool, a rotary spindle, a movable member, hydraulic means for moving said member relative to said spindle, a valve for controlling said hydraulic means, differential mechanism for controlling said valve having an element connected thereto and having gear elements actuated by said spindle and movable member, a main slide and a cross-slide, means for causing relative movement thereof, and an operative connection between said movable member and said means.

10. In a machine tool, a plurality of movable members supported on a frame, a hydraulic motor for moving one of said members at different speeds, a valve for controlling said hydraulic motor, control means for said valve including a differential mechanism connected to said valve and said movable members, and means carried by said frame for operating said control means and forming a part of the sleeve connection between said hydraulically moved member and said differential mechanism.

11. In a machine tool, a plurality of movable members supported on a frame, a hydraulic motor for moving one of said members at different speeds, a valve for controlling said hydraulic motor, control means for said valve including a differential mechanism connected to said valve and said movable members, means carried by said frame and moved in predetermined relation with said hydraulically moved member for operating said control means.

12. In a machine tool, a plurality of movable members supported on a frame, a hydraulic motor for moving one of said members relative to another at different rates, a valve for controlling said hydraulic motor, control means for said valve including a differential mechanism connected to said valve and said movable members, means carried by said frame and operatively connected to said hydraulically moved member for changing the rate thereof, the connection to said last named member including a member carried by said means and moved in timed relation with said last named member and forming a part of the operative connection between the latter and said differential mechanism.

13. In a machine tool, a plurality of movable members supported on a frame, a hydraulic motor for moving one of said members relatively to another at different rates, a valve for controlling said hydraulic motor, control means for said valve consisting of a differential mechanism connected to said movable members, and a cam means for changing the rate of movement of said hydraulically operated member and operatively connected thereto, the connection of said cam means to said last mentioned member including a means carried by said cam means, said means being supported on said frame and moved in predetermined relation with said hydraulically operated member and forming a part of the operative connection between the same and said differential mechanism.

14. In a machine tool, a plurality of movable members supported on a frame, hydraulic means for moving one of said members relative to the other, means comprising a valve and a differential mechanism operatively connected thereto and to said hydraulically moved member and another of said movable members for controlling said hydraulic means, an automatic means for connecting a slide to the hydraulically moved member to move therewith and for disconnecting said slide and member and connecting said slide to said frame.

15. In a machine tool, a plurality of movable members supported on a frame, hydraulic means for moving one of said members relative to another, means comprising a valve and a differential mechanism operatively connected thereto and to said hydraulically moved member and another of said movable members for controlling said hydraulic means, a slide supporting a movable part, means for connecting said slide to the hydraulically moved member to move therewith and for disconnecting the same to cause relative movement therebetween, and means connecting said hydraulically moved member to said movable part and effective during said relative movement between said slide and hydraulically moved member to move said part.

16. In a machine tool, a frame, a rotary member and a slidable member supported on said frame, hydraulic means for moving said slidable member relative to said rotary member, means comprising a valve and a differential mechanism operatively connected thereto and to said hydraulically moved member and said rotary member for controlling said hydraulic means, a second slidable member supporting a movable part, automatic means for connecting and disconnecting said second slidable member to the hydraulically moved member and for locking said second slidable member to the frame, and means connecting said movable part to the hydraulically moved member and effective to move said part while said second slidable member is locked to the frame.

17. In a machine tool, a pair of movable members, a frame supporting said members, hydraulic means for moving one of said members relative to the other, a control valve for said hydraulic means, said member being provided with a rack, a second rack movably carried by said frame, gearing operatively connecting said racks, and a differential mechanism operatively connected to said second named rack, the other movable member and said valve to actuate the latter.

18. In a machine tool, a pair of movable members, a frame supporting said members, hydraulic means for moving one of said members relatively to the other member at different rates, a control valve for said means, a rack carried by said hydraulically moved member, a rack movably supported by said frame, gearing operatively connecting said racks, a differential mechanism connected to said second named rack, the other of said members and said control valve to actuate the latter, and a member movably supported in said frame and connected to said second named rack to move in timed relation therewith for changing the rate of movement of said hydraulically moved member.

19. In a machine tool, a pair of movable members, a frame supporting said members, hydraulic means for moving one of said members relatively to the other at different rates, said hydraulically moved member being provided with a rack, a second rack movably supported by said frame, gearing operatively connecting said racks, and control means for said hydraulic means including a valve, a differential mechanism operatively connected thereto, and to said second named rack and the other of said movable members, and cam means movably supported by said frame and operatively connected to said second named rack to move therewith and to change the rates of movement of said hydraulically moved member.

In testimony whereof, I hereunto affix my signature.

EDWARD P. BURRELL.